(12) United States Patent
Baran et al.

(10) Patent No.: US 10,730,609 B2
(45) Date of Patent: Aug. 4, 2020

(54) FLY-BY-WIRE RETROFIT KIT

(71) Applicant: Sikorsky Aircraft Corporation, Stratford, CT (US)

(72) Inventors: Michael Paul Baran, Prospect, CT (US); Igor Cherepinsky, Sandy Hook, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 553 days.

(21) Appl. No.: 15/442,115

(22) Filed: Feb. 24, 2017

(65) Prior Publication Data

US 2017/0253320 A1 Sep. 7, 2017

Related U.S. Application Data

(60) Provisional application No. 62/303,197, filed on Mar. 3, 2016.

(51) Int. Cl.
*B64C 13/04* (2006.01)
*B64C 27/56* (2006.01)
(Continued)

(52) U.S. Cl.
CPC .............. *B64C 13/04* (2013.01); *B64C 13/22* (2013.01); *B64C 13/503* (2013.01); *B64C 27/56* (2013.01); *B64C 27/68* (2013.01); *B64F 5/00* (2013.01)

(58) Field of Classification Search
CPC ....... B64C 13/04; B64C 13/503; B64C 13/22; B64C 27/56; B64C 27/68; B64F 5/00
See application file for complete search history.

(56) References Cited

U.S. PATENT DOCUMENTS 5,493,497 A * 2/1996 Buus .................... G05D 1/0077
701/4
5,806,805 A * 9/1998 Elbert .................... B64C 13/42
244/195

(Continued)

FOREIGN PATENT DOCUMENTS

| EP | 1996459 B1 | 9/2010 |
| EP | 2311729 A1 | 4/2011 |
| EP | 2672357 A1 | 12/2013 |

OTHER PUBLICATIONS

Carey, Bill, "Sikorsky Progresses in Building Optionally Piloted Black Hawk", May 14, 2015, Retrieved from the Internet: URL: http://www.ainonline.com/aviation-news/defense/2015-05-14/sikorsky-progresses-building-optionally-piloted-black-hawk (retrieved on Jun. 23, 2017), 2 pp.

(Continued)

*Primary Examiner* — Valentina Xavier
(74) *Attorney, Agent, or Firm* — Cantor Colburn LLP

(57) ABSTRACT

A method of retrofitting a mechanically controlled aircraft with a fly-by-wire system includes removing a mechanical links between mechanical pilot inputs and actuators operable to drive flight surfaces. Electromechanical actuators are coupled between a plurality of vehicle management computers and the actuators. Each of the electromechanical actuators is operable to receive commands from the vehicle management computers and output a mechanical force to an input linkage of one of the actuators. Electromechanical pilot input modules are coupled to the mechanical pilot inputs. Each of the electromechanical pilot input modules is operable to convert a pilot-driven input force of an instance of the mechanical pilot inputs into an electronic signal indicative of the pilot-driven input force. At least one high performance computer is coupled to at least one of the vehicle management computers. The high performance (Continued)

computer executes one or more high level intelligence algorithms to selectively operate the aircraft autonomously.

7 Claims, 8 Drawing Sheets

(51) Int. Cl.
  *B64C 27/68* (2006.01)
  *B64C 13/22* (2006.01)
  *B64F 5/00* (2017.01)
  *B64C 13/50* (2006.01)

(56) References Cited

U.S. PATENT DOCUMENTS

| | | | |
|---|---|---|---|
| 6,334,592 B1 | 1/2002 | Tomio et al. | |
| 7,108,232 B2 | 9/2006 | Hoh | |
| 8,888,036 B2 | 11/2014 | Chaduc et al. | |
| 2005/0045764 A1* | 3/2005 | Morgenstern | B64C 3/16 244/10 |
| 2010/0084517 A1* | 4/2010 | Benson | B64C 27/605 244/228 |
| 2012/0290153 A1* | 11/2012 | Olsoe | B64C 13/505 701/3 |
| 2013/0168501 A1* | 7/2013 | Chaduc | B64C 27/64 244/227 |
| 2016/0329798 A1* | 11/2016 | Himmelmann | H02K 41/031 |
| 2019/0176969 A1* | 6/2019 | Zierten | B64C 13/0421 |

OTHER PUBLICATIONS

Extended European Search Report for Application No. 17159073.0-1754 dated Jul. 18, 2017 (10 pp.).

Fletcher, J.W., et al. "UH-60M Upgrade Fly-by-Wire Flight Control Risk Reduction using the RASCAL JUH-60A In-Flight Simulator", May 1, 2008, Montreal, Canada, Retrieved from the Internet: URL: http://nams.usra.edu/NAMS/assets/AFDD/AHS_2008_Fletcher_UH60MU.pdf (retrieved on Jun. 23, 2017), 26 pp.

Gubbels, A.W. et al., "The NRC Bell 412 Advanced Systems Research Aircraft—A New Facility for Airborne Simulation", Oct. 18, 2001, American Institute of Aeronautics and Astronautics, 14 pp.

Warwick, Graham. "Sikorsky prepared fly-by-wire S-92 for flight", Flight International, Aug. 6, 2007, Retrieved from the Internet: URL: http://www.flightglobal.com/news/articles/sikorsky-prepares-fly-by-wire-s-92-for-flight-215927/ (retrieved on Jun. 23, 2017), 2 pp.

"Newest UAV is a converted chopper", Internet Citation, May 5, 2005, Retrieved from the Internet: URL: http://machinedesign.com/Contentitem/60558/NewestUAVisaconvertedchipper.aspx (retrieved Jun. 5, 2008) (1 pp.).

* cited by examiner

FLY-BY-WIRE RETROFIT KIT

CROSS-REFERENCE TO RELATED APPLICATIONS

This U.S. non-provisional application claims priority to the U.S. provisional application Ser. No. 62/303,197, which was filed on Mar. 3, 2016, the contents of which are incorporated herein by reference.

BACKGROUND

The subject matter disclosed herein generally relates to flight control systems, and more particularly to a fly-by-wire kit to retrofit a mechanically controlled aircraft which enables advanced optionally piloted modes.

Legacy aircraft, such as helicopters, rely on human pilot input to provide flight control inputs to provide flight control inputs that stabilize and direct the aircraft to a desired flight path using mechanical controls. Current autopilot systems have low rate, limited motion controls and are not capable of high performance stabilization and control. Fly-by-wire technology can enhance responsiveness and provide high performance stabilization and control but typically requires a major re-design or modification of an existing mechanically controlled aircraft.

BRIEF DESCRIPTION

According to an embodiment, a method of retrofitting a mechanically controlled aircraft with a fly-by-wire system includes removing a plurality of mechanical links between a plurality of mechanical pilot inputs and a plurality of actuators operable to drive flight surfaces. A plurality of vehicle management computers is installed in the aircraft. Electromechanical actuators are coupled between the vehicle management computers and the actuators, where each of the electromechanical actuators is operable to receive commands from the vehicle management computers and output a mechanical force to an input linkage of one of the actuators. Electromechanical pilot input modules are coupled to the mechanical pilot inputs. Each of the electromechanical pilot input modules is operable to convert a pilot-driven input force of an instance of the mechanical pilot inputs into an electronic signal indicative of the pilot-driven input force. At least one high performance computer is coupled to at least one of the vehicle management computers. The high performance computer is configured to execute one or more high level intelligence algorithms to selectively operate the aircraft autonomously.

In addition to one or more of the features described above, or as an alternative, in further embodiments coupling each of the electromechanical pilot input modules to a plurality of cockpit interface units, wherein each of the cockpit interface units operable to receive an instance of the electronic signal indicative of the pilot-driven input force from each of the electromechanical pilot input modules and to communicate with at least one of the vehicle management computers.

In addition to one or more of the features described above, or as an alternative, in further embodiments_further comprising establishing triplex redundancy for each of the electromechanical pilot input modules and each of the electromechanical actuators.

In addition to one or more of the features described above, or as an alternative, in further embodiments one or more of the electromechanical pilot input modules are sensor/feel modules that provide mechanical feedback to one of the mechanical pilot inputs.

In addition to one or more of the features described above, or as an alternative, in further embodiments wherein each of the electromechanical actuators comprises a plurality of channels and each channel is coupled to an independent power unit.

In addition to one or more of the features described above, or as an alternative, in further embodiments comprising installing one or more data links, one or more weight-on-wheel sensors, one or more data concentrator units, and one or more synchro converters from a fly-by-wire retrofit kit.

In addition to one or more of the features described above, or as an alternative, in further embodiments comprising installing one or more generators, one or more batteries, a plurality of wiring connectors, a plurality of circuit breakers, and one or more synchro converters from the fly-by-wire retrofit kit.

In addition to one or more of the features described above, or as an alternative, in further embodiments using a configuration manager system to determine a plurality of control system gains associated with a platform definition of the mechanically controlled aircraft and loading the vehicle management computers with the control system gains.

According to another embodiment, a fly-by-wire retrofit kit for a mechanically controlled aircraft includes a plurality of vehicle management computers and a plurality of electromechanical actuators. Each of the electromechanical actuators is operable to receive commands from the vehicle management computers and output a mechanical force to an input linkage of an actuator. A plurality of electromechanical pilot input modules are operable to convert a pilot-driven input force into an electronic signal indicative of the pilot-driven input force.

In addition to one or more of the features described above, or as an alternative, in further embodiments comprising a plurality of cockpit interface units, each of the cockpit interface units operable to receive an instance of the electronic signal indicative of the pilot-driven input force from each of the electromechanical pilot input modules and to communicate with at least one of the vehicle management computers.

In addition to one or more of the features described above, or as an alternative, in further embodiments each of the electromechanical pilot input modules and each of the electromechanical actuators has triplex redundancy.

In addition to one or more of the features described above, or as an alternative, in further embodiments one or more of the electromechanical pilot input modules are sensor/feel modules that provide mechanical feedback to a mechanical pilot input.

In addition to one or more of the features described above, or as an alternative, in further embodiments each of the electromechanical actuators comprises a plurality of channels and each channel is driven by an independent power unit.

In addition to one or more of the features described above, or as an alternative, in further embodiments comprising one or more data links, one or more weight-on-wheel sensors, one or more data concentrator units, and one or more synchro converters.

In addition to one or more of the features described above, or as an alternative, in further embodiments comprising one or more generators, one or more batteries, a plurality of wiring connectors, and a plurality of circuit breakers.

According to yet another embodiment, a kit for selectively providing enhanced control of an aircraft includes a plurality of external sensors and at least one high performance computer arranged in communication with a vehicle management computer of the aircraft. The at least one high performance computer is configured to execute one or more intelligence algorithms using data provided by the plurality of external sensors. The aircraft is operable in a non-autonomous mode and an autonomous mode and the one or more intelligence algorithms executed by the high performance computer vary in response to the operational mode selected.

In addition to one or more of the features described above, or as an alternative, in further embodiments the non-autonomous mode is selected from single pilot operation and two pilot operation.

In addition to one or more of the features described above, or as an alternative, in further embodiments at least one of the plurality of external sensors is configured to communicate with one or more of a satellite, ground station, and another aircraft.

In addition to one or more of the features described above, or as an alternative, in further embodiments the plurality of external sensors are configured to provide raw data for use by an intelligent system.

In addition to one or more of the features described above, or as an alternative, in further embodiments the intelligent system is selected from Light Detection and Ranging (LIDAR), Laser Detection and Ranging (LADAR), Radio Detection and Ranging (RADAR), and Global Positioning System (GPS).

In addition to one or more of the features described above, or as an alternative, in further embodiments comprising a data link for communicating a command, mission, or other information from a source located remotely to the aircraft.

In addition to one or more of the features described above, or as an alternative, in further embodiments comprising a plurality of electromechanical actuators, each of the electromechanical actuators operable to receive commands from the vehicle management computer and output a mechanical force to an input linkage of an actuator; and a plurality of electromechanical pilot input modules, each of the electromechanical pilot input modules operable to convert a pilot-driven input force into an electronic signal indicative of the pilot-driven input force.

According to another embodiment, an aircraft includes a plurality of movable flight surfaces, a plurality of actuators, each actuator being associated with one of said flight surfaces, a plurality of mechanical pilot inputs, each mechanical pilot input being associated with one of said actuators, and a fly-by-wire control system for converting a force applied to one of the mechanical pilot inputs into an electronic signal receivable by one of the plurality of actuators to move a corresponding flight surface. The aircraft is selectively operable in a non-autonomous mode and an autonomous mode by installing at least one high performance computer coupled to a vehicle management computer of the control system. The high performance computer being configured to execute one or more high level intelligence algorithms based on the mode of operation selected.

In addition to one or more of the features described above, or as an alternative, in further embodiments the fly-by-wire control system is created by applying a retrofit kit to a mechanical control system.

In addition to one or more of the features described above, or as an alternative, in further embodiments applying the retrofit kit include removing a plurality of mechanical links between the plurality of pilot inputs and the plurality of actuators, installing at least one vehicle management computer, coupling a plurality of electromechanical actuators between the vehicle management computers and the actuators, each of the electromechanical actuators being operable to receive commands from the vehicle management computers and provide an output to one of the actuators, and coupling a plurality of electromechanical pilot input modules to the mechanical pilot inputs, each of the electromechanical pilot input modules operable to convert a pilot-driven input force of an instance of the mechanical pilot inputs into an electronic signal indicative of the pilot-driven input force.

BRIEF DESCRIPTION OF THE DRAWINGS

Referring now to the drawings wherein like elements are numbered alike in the several FIGURES, in which.

DETAILED DESCRIPTION

Figure 1:
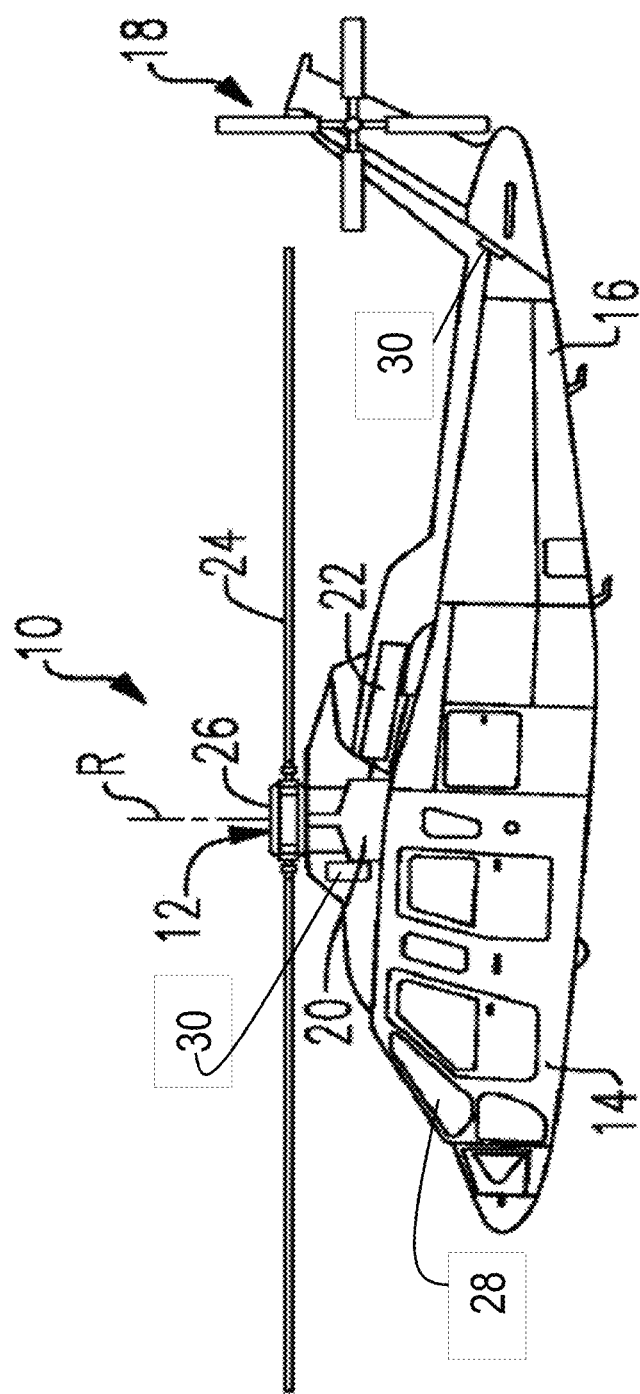
FIG. 1 schematically depicts an aircraft in accordance with an embodiment.

Referring now to FIG. 1, a rotary-wing aircraft 10 having a main rotor assembly 12 is illustrated. The aircraft 10 includes an airframe 14 having an extending tail 16 which mounts a tail rotor system 18, such as an anti-torque system, a translational thrust system, a pusher propeller, a rotor propulsion system, and the like. The main rotor assembly 12 is driven about an axis of rotation R through a main gearbox (illustrated schematically at 20) by one or more engines 22. The main rotor assembly 12 includes a multiple of rotor blades 24 mounted to a rotor hub 26. Pilot controls in cockpit 28 drive mechanical actuators 30 of the main rotor assembly 12 and the tail rotor system 18, where the mechanical actuators 30 can be any type of non-electronic actuators, such as hydraulic actuators. The mechanical actuators 30 are coupled to corresponding control surfaces (not shown). Although a particular helicopter configuration is illustrated and described in the disclosed embodiment as an example of a mechanically controlled aircraft, other configurations and/or machines, such as high speed compound rotary wing aircraft with supplemental translational thrust systems, dual contra-rotating, coaxial rotor system aircraft, turbo-props, tilt-rotors and tilt-wing aircraft with mechanical controls, will also benefit from embodiments of the invention.

In conventional aircrafts, each of the actuators 30 is coupled to one or more pilot inputs via a mechanical coupling or linkage. As a result, application of a force to or movement of a pilot input, such as an inceptor for example, generates a corresponding movement of an actuator 30 connected thereto, to initiate and execute a desired command or maneuver of the aircraft. To improve operation of the aircraft 10, it may be desirable to update such mechanical control systems to include "fly-by-wire" capability.

Figure 2:
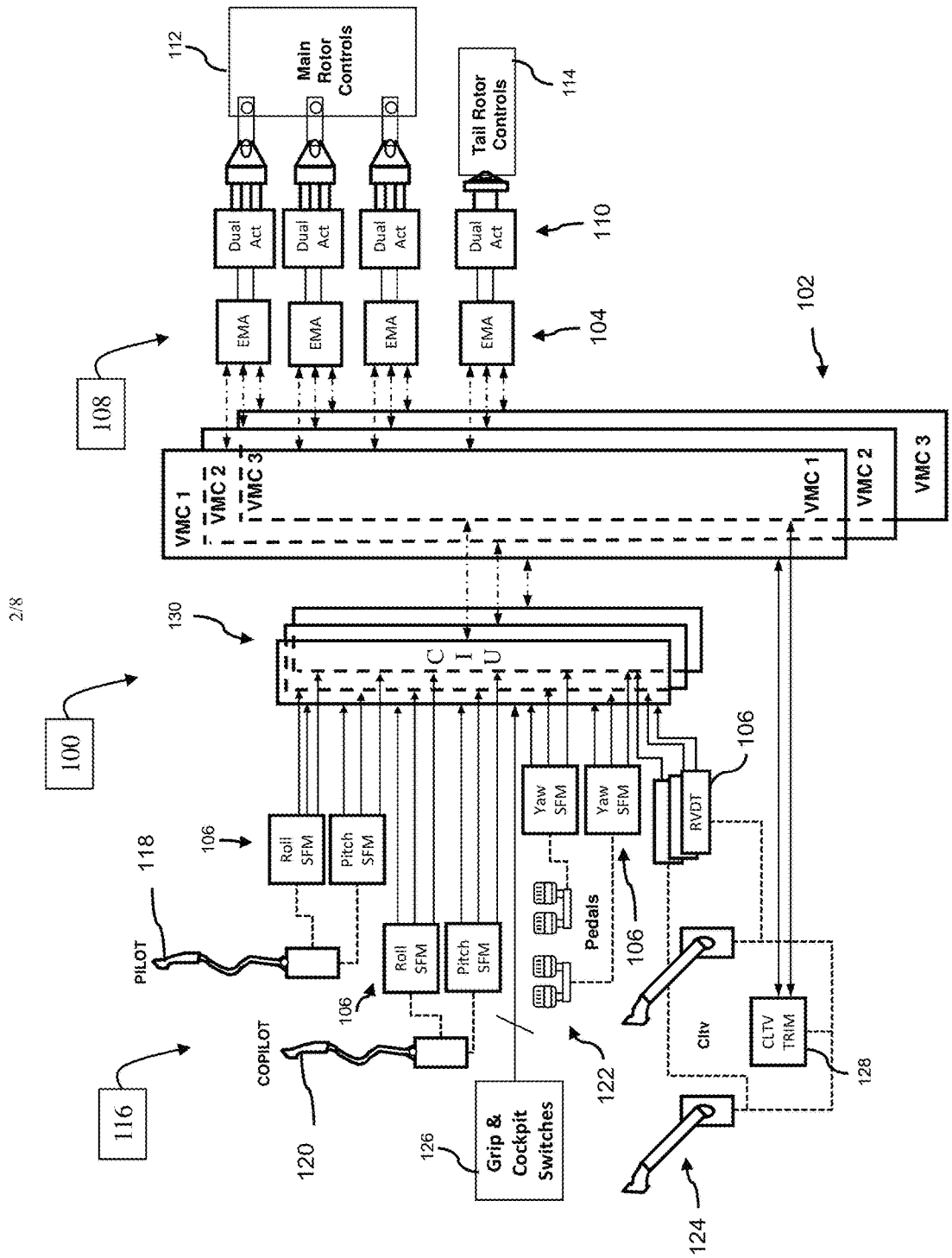
FIG. 2 schematically depicts a portion of a retrofitted fly-by-wire vehicle control system in accordance with an embodiment.

Referring now to FIG. 2, a schematic diagram of a portion of a vehicle control system 100 which has been modified using a fly-by-wire retrofit kit 150 (see FIG. 4) is illustrated. The control system 100 includes a plurality of vehicle management computers 102, a plurality of electromechanical actuators 104, and a plurality of electromechanical pilot input modules 106. The two or more of the electromechanical actuators 104 may be collectively referred to as an electromechanical mixer 108. In the non-limiting embodiment of FIG. 2, electromechanical mixer 108 includes three electromechanical actuators 104 that are each operable to receive commands from the vehicle management computers 102 and output a mechanical force to an input linkage of an actuator 110 to drive the flight control surfaces of the aircraft 10. Actuators 110 of FIG. 2 correspond to actuators 30 of FIG. 1. As shown, actuators 110 are dual hydromechanical actuators; however, any type of actuator is considered within the scope of the disclosure.

In an embodiment, each of three electromechanical actuators 104 provides servo control to drive a corresponding actuator 110 associated with the main rotor controls 112 of main rotor assembly 12 of FIG. 1. A single instance of the electromechanical actuator 104 can be driven by any of the vehicle management computers 102 to provide servo control to a dual hydromechanical actuator 110 for tail rotor controls 114 of tail rotor assembly 18 of FIG. 1.

Each of the electromechanical pilot input modules 106 is operable to convert a pilot-driven input force applied to one of a plurality of mechanical pilot inputs 116 into an electronic signal indicative of the pilot-driven input force. Examples of mechanical pilot inputs 116 can include a pilot stick 118, also referred to as an inceptor, a copilot stick 120, pedals 122, and collective 124. Other pilot inputs can include grip and cockpit switches 126 and collective trim 128. The retrofitted fly-by-wire vehicle control system 100 can also include a plurality of cockpit interface units 130, where each of the cockpit interface units 130 is operable to receive an instance of the electronic signal indicative of the pilot-driven input force from each of the electromechanical pilot input modules 106 and to communicate with at least one of the vehicle management computers 102. In the non-limiting embodiment of FIG. 2, each of the electromechanical pilot input modules 106, each of the cockpit interface units 130, each of the vehicle management computers 102, and each of the electromechanical actuators 104 has triplex redundancy. Thus, each of the electromechanical pilot input modules 106 is connected to all three of the cockpit interface units 130, each of the cockpit interface units 130 is connected to a corresponding vehicle management computer 102, and each the electromechanical actuators 104 is connected to all three vehicle management computers 102. In some embodiments, the electromechanical pilot input modules 106 can be implemented as sensor/feel modules that provide mechanical feedback to one of the mechanical pilot inputs 116 and/or mechanical position detecting sensors, such as rotary variable differential transformers or resolvers.

Figure 3:
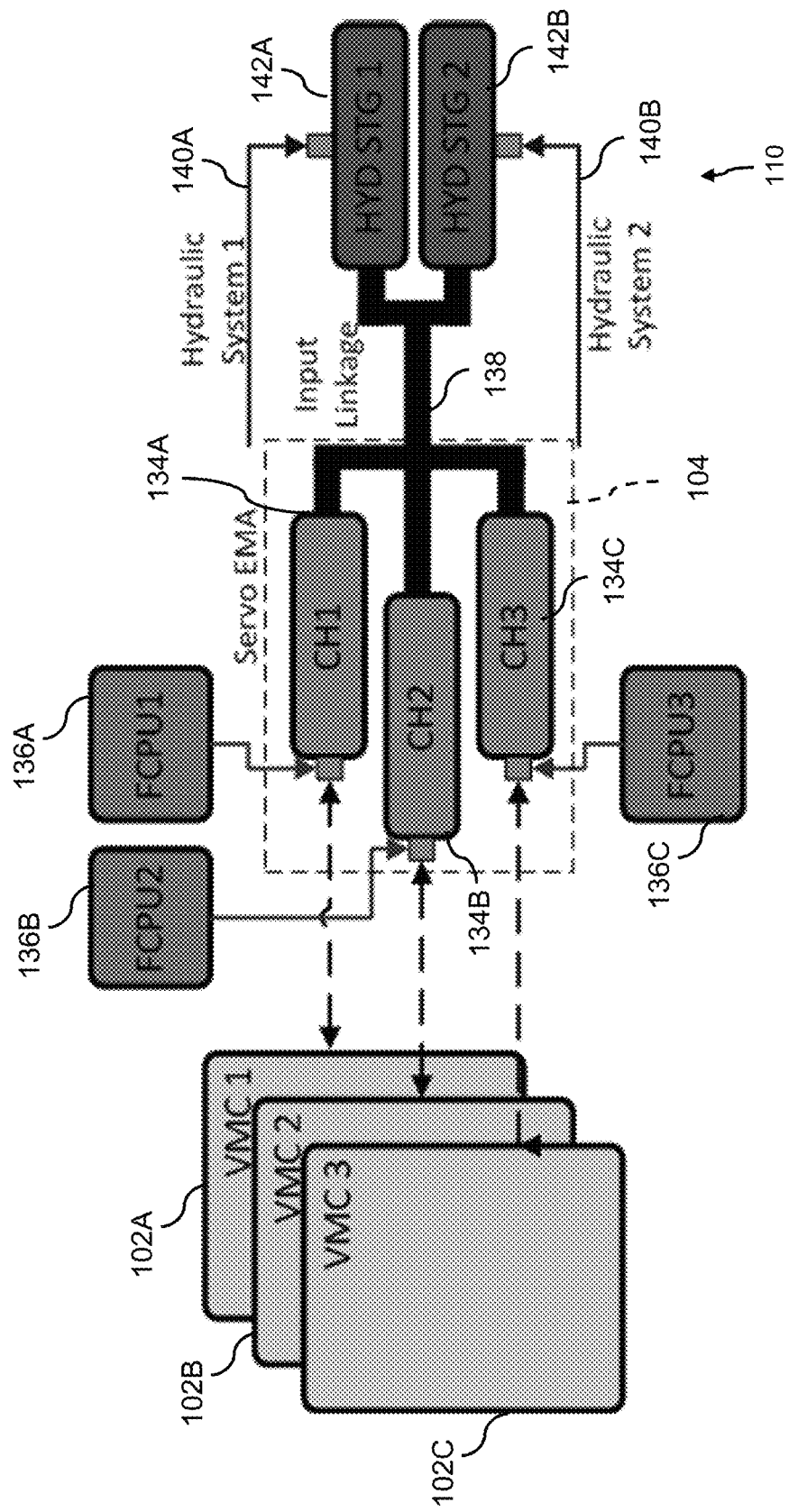
FIG. 3 schematically depicts a block diagram of a triplex redundant electromechanical actuator of the retrofitted fly-by-wire vehicle control system of FIG. 2 in accordance with embodiments.

FIG. 3 schematically depicts a block diagram of triplex redundancy of an electromechanical actuator 104 of the retrofitted fly-by-wire vehicle control system 100 of FIG. 2 in accordance with embodiments. As can be seen in the example of FIG. 3, vehicle management computer 102A is coupled to channel one 134A of electromechanical actuator 104, vehicle management computer 102B is coupled to channel two 134B of electromechanical actuator 104, and vehicle management computer 102C is coupled to channel three 134C of electromechanical actuator 104. Each of the channels 134A-134C is coupled to an independent power unit. For instance, flight critical power unit one 136A provides electrical power to channel one 134A, flight critical power unit two 136B provides electrical power to channel two 134B, and flight critical power unit three 136C provides electrical power to channel three 134C. The channels 134A-134C collective provide servo control to an input linkage 138 of actuator 110, where relatively small movements of the input linkage 138 are amplified through hydraulic pressure of hydraulic system one 140A at hydraulic stage one 142A and hydraulic pressure of hydraulic system two 140B at hydraulic stage two 142B. It will be understood that the triplex redundancy depicted in FIG. 3 for a single instance of the electromechanical actuator 104 can be repeated for all instances of the electromechanical actuator 104 in FIG. 2.

Figure 4:
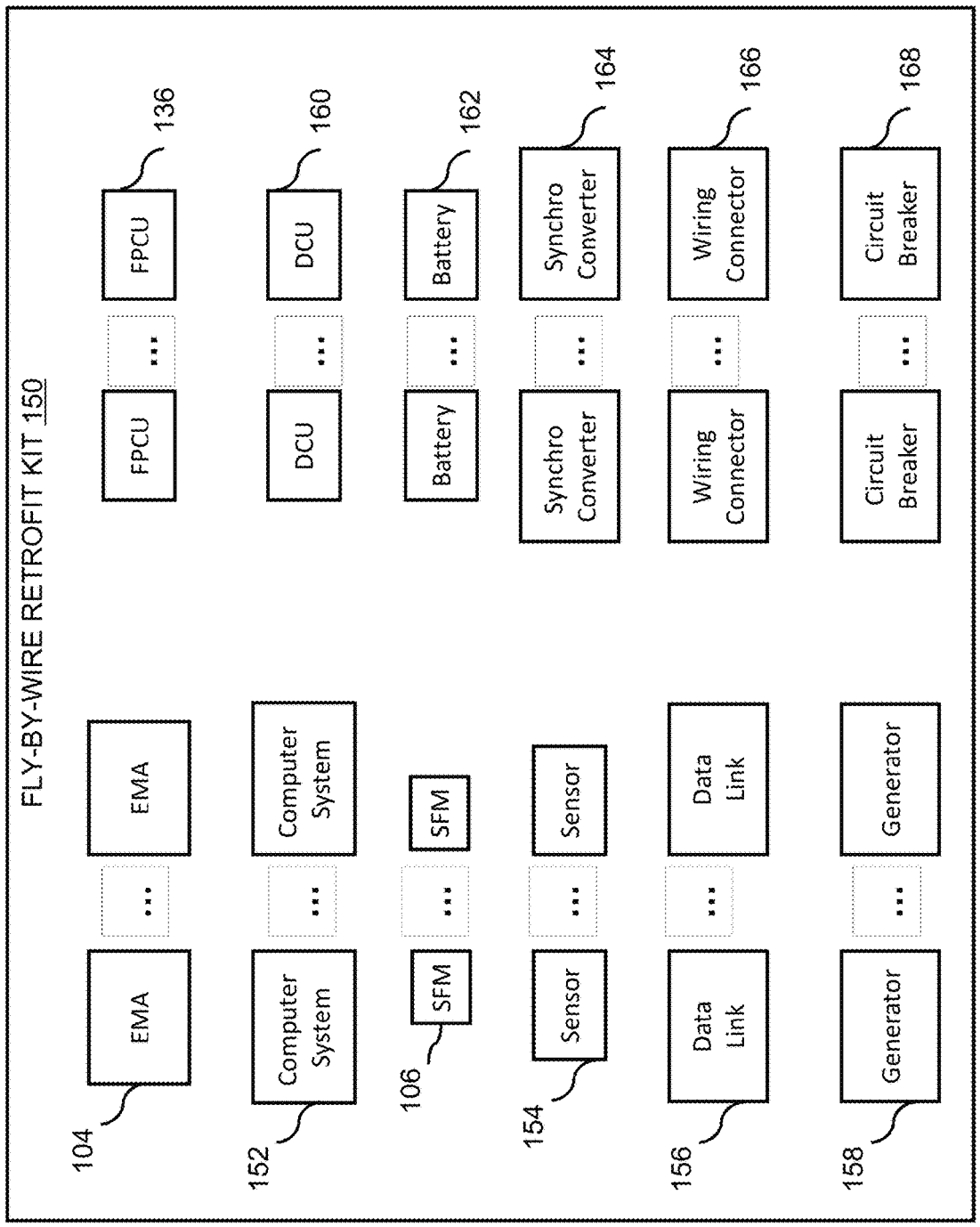
FIG. 4 depicts an example of a fly-by-wire retrofit kit in accordance with embodiments.

FIG. 4 depicts an example of a fly-by-wire retrofit kit 150. The fly-by-wire retrofit kit 150 can include all of the modules needed to convert an existing mechanically controlled aircraft to a fly-by-wire aircraft in the field. Modules of the fly-by-wire retrofit kit 150 can be sized to fit in existing structures of the airframe 14 of FIG. 1. Depending upon the platform definition of a specific instance of aircraft 10, the fly-by-wire kit 150 can be customized by selecting from a collection of components and configuring control system gains. The fly-by-wire retrofit kit 150 can include, for instance, one or more electromechanical actuators 104, one or more electromechanical pilot input modules 106, one or more computer systems 152 such as vehicle management computers 102 and cockpit interface units 130, one or more sensors 154 such as weight-on-wheel sensors, one or more data links 156 for communication, one or more generators 158 to provide electrical power, one or more flight critical power units 136 to provide conditioned power, one or more data concentrator units 160 to collect and distribute data, one or more batteries 162, one or more synchro converters 164 to convert synchro (or resolver) analog shaft angle information to a digital angle format, wiring connectors 166, and circuit breakers 168.

Various locations in the aircraft 10 of FIG. 1 where mechanical control components are removed can be used to house components of the fly-by-wire retrofit kit 150 upon installation. For instance, upon removal of mechanical linkages from the cockpit substructure, the electromechanical pilot input modules 106 can be installed in the cockpit substructure of the aircraft 10 of FIG. 1. Mechanical controls in the cabin of the aircraft 10 of FIG. 1 can be replaced with the cockpit interface units 130 and one or more of the batteries 162. The vehicle management computers 102 can be distributed in various locations, such as an antenna well and/or tailcone of the aircraft 10 of FIG. 1.

Figure 5:
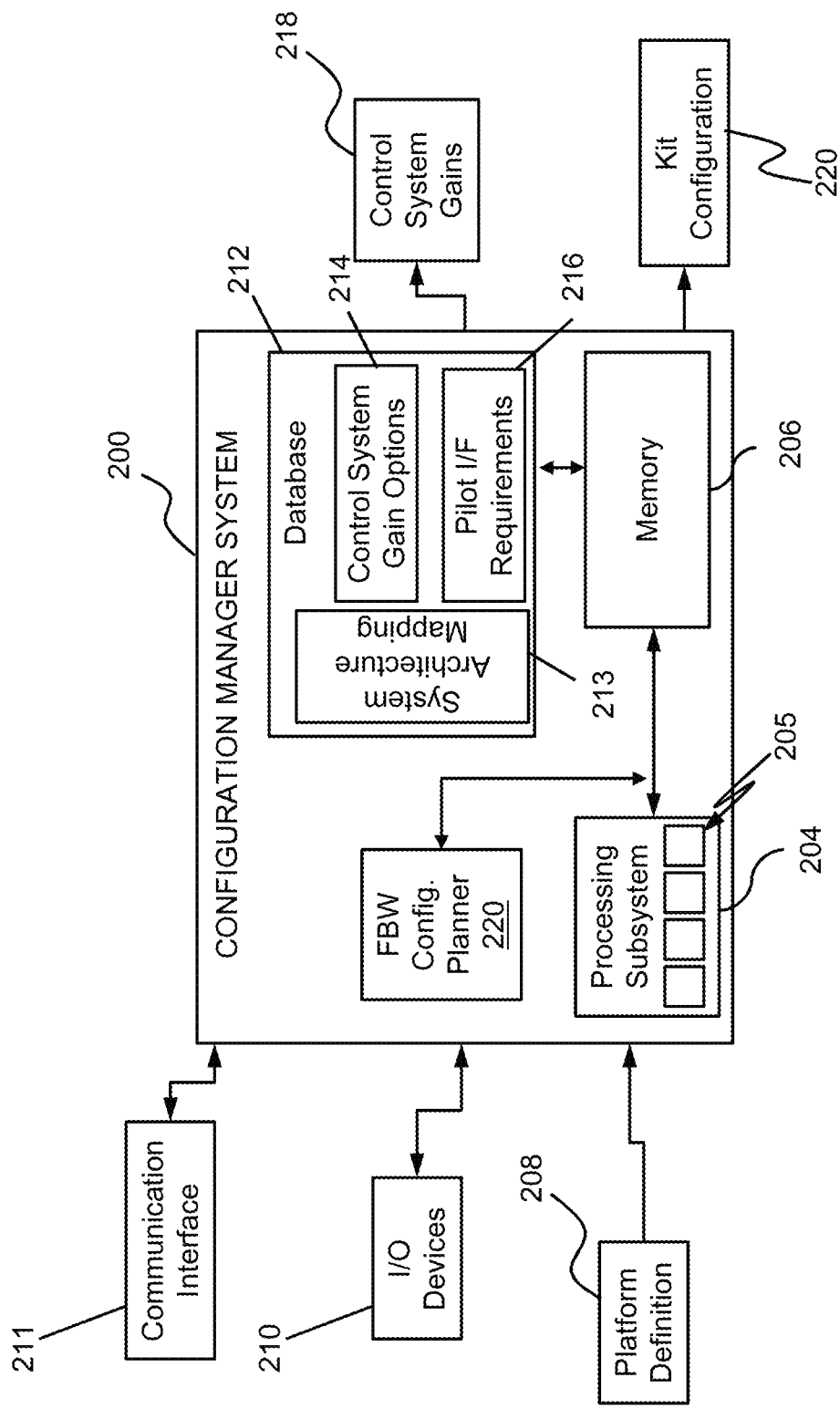
FIG. 5 depicts a configuration manager system in accordance with embodiments.

FIG. 5 depicts a configuration manager system 200 capable of executing instructions for implementing a fly-by-wire configuration planner 202. The configuration manager system 200 can receive a platform definition 208 through one or more input/output (I/O) devices 210 or communication interface 211 as a manual input or upload from a remote system, where the platform definition 208 defines parameters of a mechanically controlled aircraft to be reconfigured with fly-by-wire controls. As depicted in FIG. 5, the configuration manager system 200 includes memory 206 that communicates with a processing subsystem 204. The memory 206 may store the fly-by-wire configuration planner 202 as executable instructions that are executed by the processing subsystem 204. The memory 206 is an example of a non-transitory computer readable storage medium tangibly embodied in the configuration manager system 200 including executable instructions stored therein, for instance, as firmware. Also, in some embodiments, memory 206 may include random access memory (RAM), read-only memory (ROM), or other electronic, optical, magnetic or any other computer readable medium onto which instructions and data are stored. Accordingly, the memory 206 may also hold various data values to support mapping of parameters and computations to determine control system gains 218 and a kit configuration 220 of the fly-by-wire retrofit kit 150 of FIG. 4.

The processing subsystem 204 may include any number and type of processors, including a general purpose processor, a digital signal processor, a microcontroller, an application specific integrated circuit, a field programmable gate array, or the like. In an exemplary embodiment, the processing subsystem 204 includes a plurality of processing resources 205, which may be separate cores, processing circuits, and/or processors supporting parallel computing. Although depicted as singular blocks, the processing subsystem 204 and memory 206 can be distributed between multiple processing circuits and memory subsystems. In an embodiment, the processing subsystem 204 performs additional processing tasks for the configuration manager system 200. The configuration manager system 200 may be embodied in a variety of computer systems, such as a desktop computer, laptop computer, tablet computer, and/or mobile device.

The configuration manager system 200 includes a database 212 to store a variety of values, such as a system architecture mapping 213, control system gain options 214, pilot interface requirements 216, available module definitions (not depicted), and the like. The I/O devices 210 may include a display device or screen, audio speakers, a graphical user interface (GUI), a keyboard, touchscreen, and the like. In some embodiments, the I/O devices 210 may be used to enter or adjust the system architecture mapping 213, control system gain options 214, and/or pilot interface requirements 216. It is to be appreciated that the configuration manager system 200 is illustrative. In some embodiments, additional components or entities not shown in FIG. 5 may be included. In some embodiments, one or more of the components or entities may be optional. In some embodiments, the components or entities of the system 200 may be arranged or configured differently from what is shown in FIG. 5. In an embodiment, the fly-by-wire configuration planner 202 enables a user to add/subtract hardware based on the platform definition 208, the system architecture mapping 213, control system gain options 214, and/or the pilot interface requirements 216 to determine the kit configuration 220 and the control system gains 218. The control system gains 218 define software modifications specific to control theory of the platform definition 208 to be loaded into the vehicle management computers 102 of FIG. 2. The database 212 collects a larger number of configuration options over a period of time as various platforms are analyzed and configured. The fly-by-wire configuration planner 202 can define modifications to a baseline system definition to implement a fly-by-wire conversion using the kit configuration 220 and the control system gains 218 to populate and program modules of the fly-by-wire retrofit kit 150 of FIG. 4.

Figure 6:
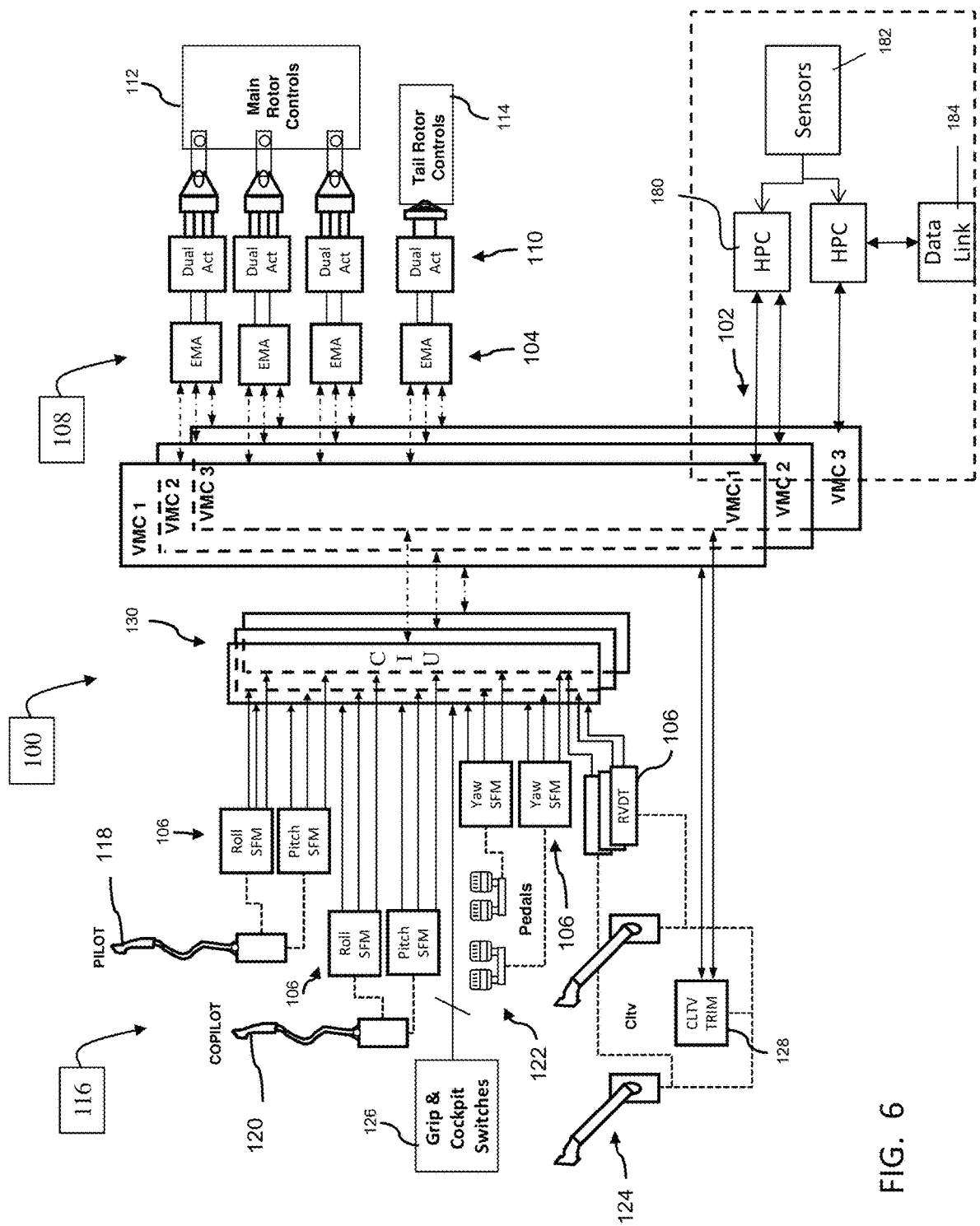
FIG. 6 schematically depicts a system architecture for operating an aircraft capable of autonomous flight and having a retrofitted fly-by-wire vehicle control system in accordance with embodiments.
Figure 7:
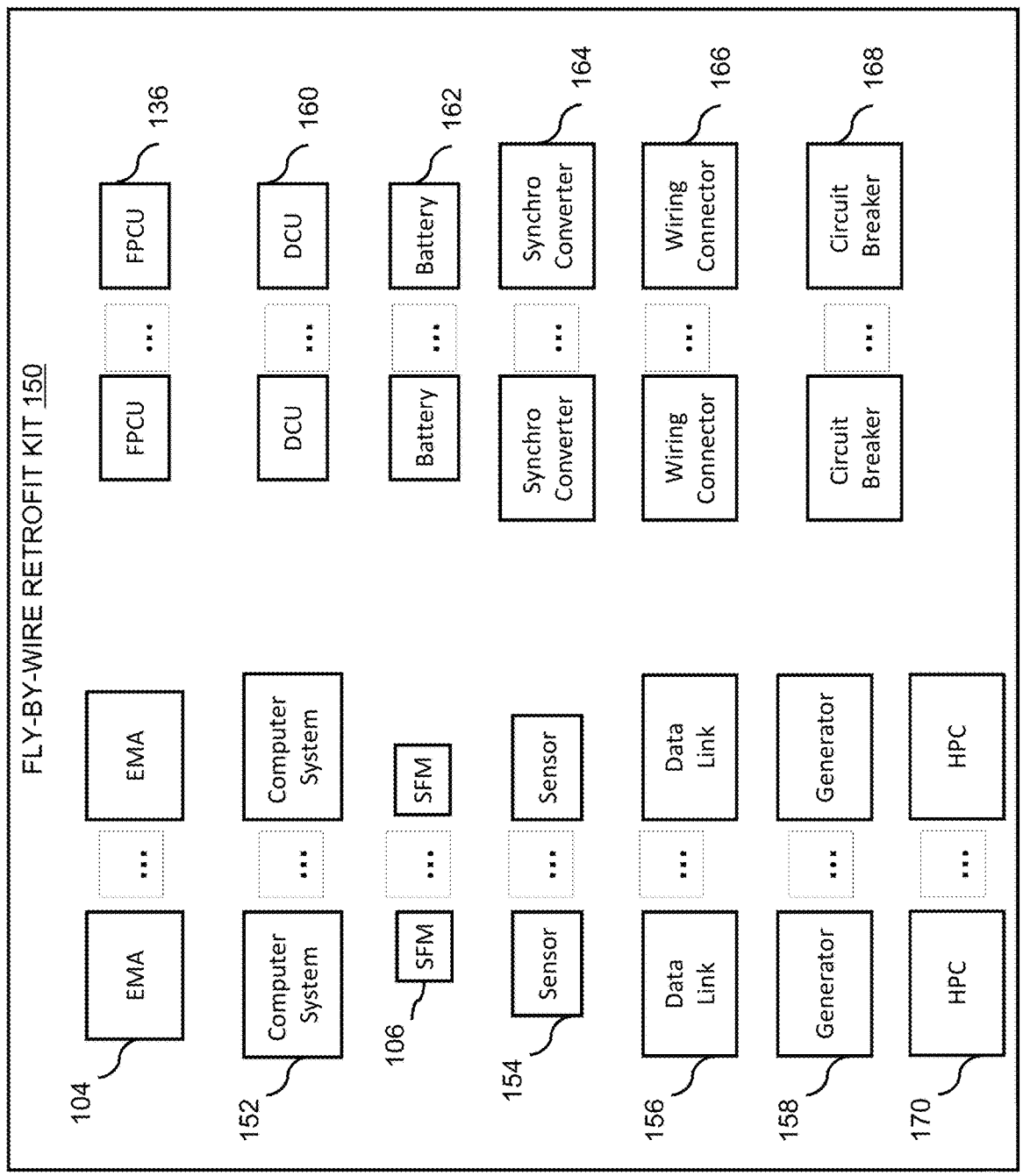
FIG. 7 schematically depicts a portion of a retrofitted fly-by-wire vehicle control system for an aircraft capable of autonomous flight in accordance with embodiments.
Figure 8:
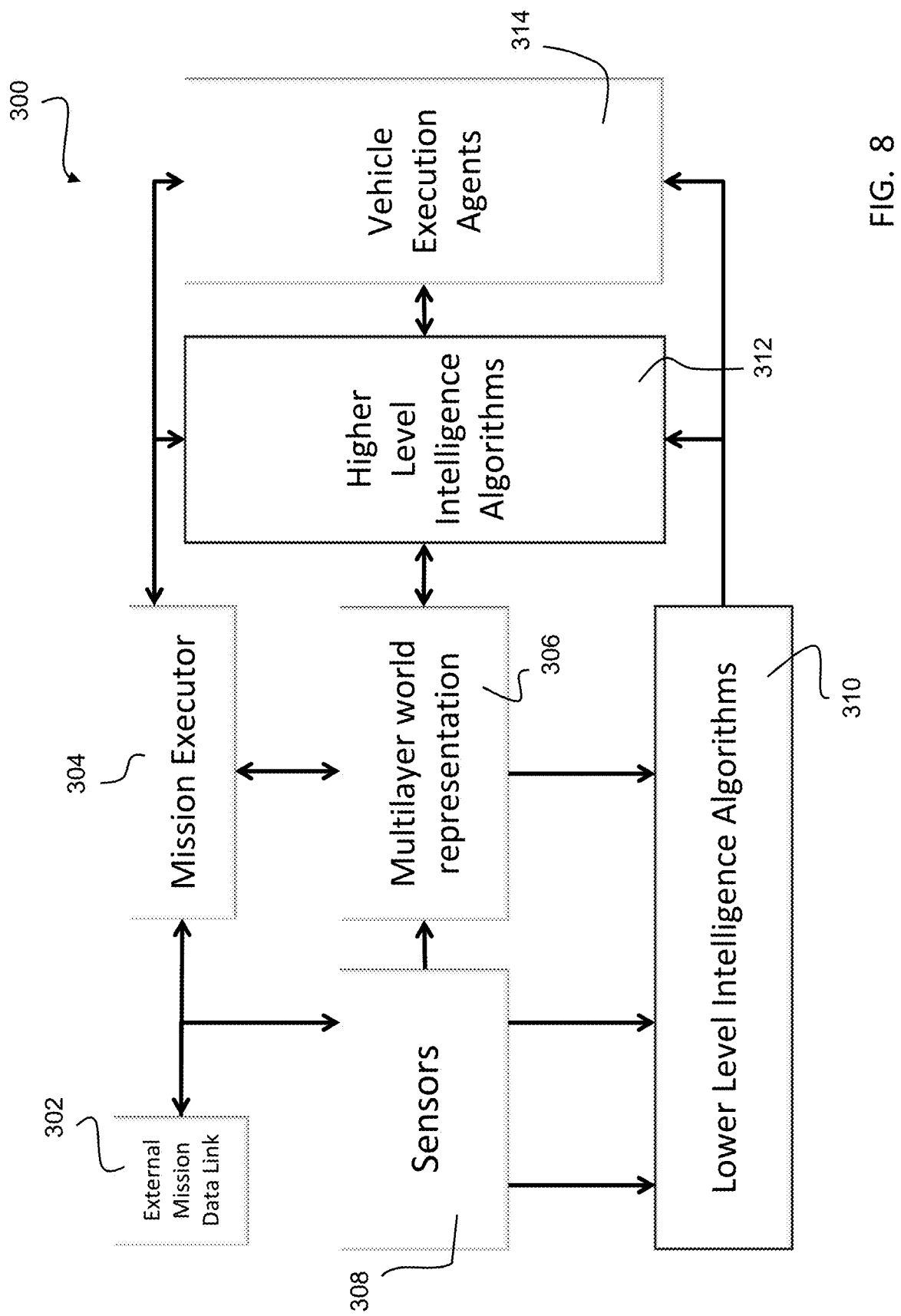
FIG. 8 depicts an example of a fly-by-wire retrofit kit for an aircraft capable of autonomous flight in accordance with embodiments.

With reference now to FIGS. 6-8, the vehicle control system 100 may be further modified to allow for operation of the aircraft 10 in a plurality of modes, such as two pilot operation, single pilot operation, and autonomous flight. In one embodiment, the operational mode of the aircraft 10 may be selected via a switch located in the cockpit, or alternatively, may be provided as an input to the control system 100 remotely. Detection of the mode of operation may be determined via a plurality of control laws.

In such embodiments, in addition to the components previously described with respect to FIG. 2, the vehicle control system 100 and retrofit kit 150, illustrated in FIG. 7, further include at least one high performance computer (HPC) 180 operable to send commands to and receive commands from the one or more vehicle management computers 102 (see FIG. 6). In the illustrated, non-limiting embodiment, the system 100 includes two HPCs; however, a control system 100 including any number of HPCs 180 is within the scope of the disclosure. The at least one HPC 180 is configured to receive information from one or more sensors 182 of the aircraft 10. Examples of such sensors 182 include, but are not limited to, accelerometers, speedometers, pressure transducers, pitch sensors, wind sensors for example. In some embodiments, the sensors 182 may be configured to provide raw data for use by one or more intelligent systems, such as Light Detection and Ranging (LIDAR), Laser Detection and Ranging (LADAR), Radio Detection and Ranging (RADAR), and Global Positioning System (GPS) for example. In addition, the sensors 182 may be configured to communicate with a device external to the aircraft 10, such as a ground station, a satellite, or another aircraft for example. A data link 184, may additionally be configured to communicate with at least one of the HPCs 180 of the control system 100.

In an embodiment, the one or more HPCs 180 include a ruggedized multi-slot chassis having a plurality, such as four for example, identical Single Board Computers (SBC), an Ethernet Switch, and at least one Field Programmable Gate Arrays (FPGA's). The HPC 180 may additionally contain internal solid state hard drives to be used for sensor data storage or other storage applications. The HPC 180 can support graphics cards to drive displays or image processing.

The at least one HPC 180 provides the capability to incorporate High Level Intelligence Algorithms (see FIG. 7) into the vehicle control system 100. Depending on the selected mode of operation, one or more of these algorithms may be implemented to provide assisted control the aircraft. In one embodiment, the HPC 180 includes the minimum algorithms required to enable fully autonomous operation of the aircraft 10. Examples of the algorithms that will be implemented in the HPC include, but are not limited to path planning, landing zone detection, obstacle avoidance, and perception for example. The HPC 180 may additionally host a variety of third party applications as selected by the user.

With reference now to FIG. 8, a system architecture 300 of an aircraft 10 having been modified with retrofit kit 150 of FIG. 7 is illustrated. The architecture includes an external data link, a mission executor, high level intelligence algorithms, low level intelligence algorithms. The data link, illustrated schematically at 302, and comparable to item 184 of FIG. 6, is configured to transmit a command, mission, or other information from a person or computing device located remotely to the aircraft 10. For example, a mission to fly the aircraft 10 to a designated location may be communicated to the data link 302 and then transmitted to the mission executor 304 where it is processed. A processor 306 arranged in communication with the mission executor 304 is configured to generate a multi-layer representation of the geographical area surrounding the aircraft 10, including known obstacles. This world representation is updated continuously or at desired intervals in response to information, such as regarding obstacles for example, provided by the mission executor 304 and also by one or more external sensors 308 of the aircraft 10. As previously suggested, the external sensors 308 may be associated with one or more of LIDAR, RADAR, GPS, cameras, and an RF transceiver.

The processor 306 is additionally arranged in communication with the one or more low level intelligence algorithms, illustrated schematically at 310, and the one or more high level intelligence algorithms, illustrated schematically at 312. The low level intelligence algorithms 310 are configured to receive an input form the processor 306 and evaluate basic fly-by-wire operations and other operations needed to fly the aircraft 10 safely. The higher level intelligence algorithms 312 are configured to run one or more advanced algorithms to identify how best to operate the aircraft 10 to complete the mission. For example, the higher level intelligence algorithms 312 may identify the best flight path of the aircraft 10 from a current location to a designated location, based on the information provided thereto by the lower level intelligence algorithms 310, the processor 306, and the mission executor 304, such as the aircraft performance data and the goal of the mission. The high and low level intelligence algorithms executed will vary based on the selected mode of the aircraft 10.

The mission executor 304 and both the lower lever and higher level intelligence algorithms 310, 312 are operably coupled to one or more vehicle execution agents 314 to implement one or more commands associated with operation of the aircraft 10. In one embodiment, the vehicle execution agents 314 include at least one of the actuators 104 or 110 previously described herein. The intelligence algorithms 310, 312 may be configured to communicate with the vehicle execution agents 314 directly or indirectly, such as through the vehicle management computers 102 for example.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure.

Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A fly-by-wire retrofit kit for a mechanically controlled aircraft, the kit comprising:
   a plurality of vehicle management computers;
   a plurality of electromechanical actuators, each of the electromechanical actuators operable to receive commands from each of the vehicle management computers and output a mechanical force to an input linkage of an actuator, individual ones of the electromechanical actuators comprising triplex redundancy and a plurality of channels, each of the channels for the individual ones being separately coupled to one of the vehicle management computers to communicate only with the one of the vehicle management computers to which each of the channels has been coupled; and
   a plurality of electromechanical pilot input modules, each of the electromechanical pilot input modules operable to convert a pilot-driven input force into an electronic signal indicative of the pilot-driven input force.

2. The fly-by-wire retrofit kit of claim 1, further comprising a plurality of cockpit interface units, each of the cockpit interface units operable to receive an instance of the electronic signal indicative of the pilot-driven input force from each of the electromechanical pilot input modules and to communicate with at least one of the vehicle management computers.

3. The fly-by-wire retrofit kit of claim 1, wherein each of the electromechanical pilot input modules and each of the electromechanical actuators has the triplex redundancy.

4. The fly-by-wire retrofit kit of claim 1, wherein one or more of the electromechanical pilot input modules are sensor/feel modules that provide mechanical feedback to a mechanical pilot input.

5. The fly-by-wire retrofit kit of claim 1, wherein each of the channels is driven by an independent power unit.

6. The fly-by-wire retrofit kit of claim 1, further comprising: one or more data links, one or more weight-on-wheel sensors, one or more data concentrator units, and one or more synchro converters.

7. The fly-by-wire retrofit kit of claim 1, further comprising: one or more generators, one or more batteries, a plurality of wiring connectors, and a plurality of circuit breakers.

* * * * *